US012602051B2

(12) United States Patent
Akatsuka et al.

(10) Patent No.: US 12,602,051 B2
(45) Date of Patent: Apr. 14, 2026

(54) REMOTE SUPPORT SYSTEM AND MOBILE BODY

(71) Applicant: TOYOTA JIDOSHA KABUSHIKI KAISHA, Toyota (JP)

(72) Inventors: Kosuke Akatsuka, Mishima (JP); Hirofumi Momose, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 18/619,561

(22) Filed: Mar. 28, 2024

(65) Prior Publication Data

US 2025/0036128 A1 Jan. 30, 2025

(30) Foreign Application Priority Data

Jul. 24, 2023 (JP) ................................. 2023-119988

(51) Int. Cl.
| | |
|---|---|
| *G05D 1/22* | (2024.01) |
| *G05D 1/221* | (2024.01) |
| *G05D 1/86* | (2024.01) |
| *G05D 109/10* | (2024.01) |
| *G05D 111/30* | (2024.01) |

(52) U.S. Cl.
CPC .............. *G05D 1/221* (2024.01); *G05D 1/86* (2024.01); *G05D 2109/10* (2024.01); *G05D 2111/30* (2024.01)

(58) Field of Classification Search
CPC ...... G05D 1/221; G05D 1/86; G05D 2109/10; G05D 2111/30; G05D 1/2232; G05D 1/226
See application file for complete search history.

(56) References Cited

U.S. PATENT DOCUMENTS

| | | | |
|---|---|---|---|
| 11,215,982 B2 | 1/2022 | Urano et al. | |
| 11,325,618 B2 | 5/2022 | Umeda | |
| 2019/0137999 A1 | 5/2019 | Taguchi et al. | |
| 2020/0209888 A1 | 7/2020 | Sakai et al. | |
| 2020/0294325 A1* | 9/2020 | Mueller-Lerwe | ..... H04L 67/125 |
| 2020/0326702 A1 | 10/2020 | Iwamoto et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |

FOREIGN PATENT DOCUMENTS

| | | |
|---|---|---|
| JP | 2017-111795 A | 6/2017 |
| JP | 2018-164440 A | 10/2018 |
| JP | 2019-077528 A | 5/2019 |

* cited by examiner

*Primary Examiner* — Rodney A Butler

(74) *Attorney, Agent, or Firm* — SoraIP, Inc.

(57) ABSTRACT

The remote support system includes a mobile body, a mobile terminal, and a safety device. The mobile terminal wirelessly transmits a control signal based on an operation input from an operator who remotely supports the mobile body to the mobile body. The safety device is physically connected to the mobile terminal and exchanges diagnostic signals with the mobile body via the mobile terminal. The mobile body executes the traveling control of the mobile body based on the control signal from the mobile terminal when the abnormality is not detected in the diagnostic signal received from the safety device via the mobile terminal, and does not execute the traveling control when the abnormality is detected.

12 Claims, 3 Drawing Sheets

FIG. 1

REMOTE SUPPORT SYSTEM AND MOBILE BODY

CROSS-REFERENCE TO RELATED APPLICATION

This application claims priority to Japanese Patent Application No. 2023-119988 filed on Jul. 24, 2023, incorporated herein by reference in its entirety.

BACKGROUND

1. Technical Field

The present disclosure relates to technology for performing remote support of a mobile body using a mobile terminal.

2. Description of Related Art

Japanese Unexamined Patent Application Publication No. 2019-077528 (JP 2019-077528 A) discloses a remote operating system for remotely operating an industrial vehicle using a mobile terminal as a remote operating device.

SUMMARY

According to the technology described in JP 2019-077528 A, when an abnormality occurs in an operating system that uses the mobile terminal, unintended behavior may occur in the industrial vehicle (mobile body). In order to circumvent such a situation, it is conceivable to provide the mobile body with an emergency stop switch. However, as a result, an operator would be required to stay in the vicinity of the mobile body during execution of the remote operation, even though the mobile terminal is being used for the remote operation. This is undesirable from the perspective of convenience of remote support using the mobile terminal.

The present disclosure has been made in view of the above-described problem, and an object thereof is to provide technology that is capable of achieving both convenience of remote support using a mobile terminal, and suppression of unintended behavior of a mobile body when an abnormality occurs in an operating system using the mobile terminal.

A remote support system according to the present disclosure includes a mobile body, a mobile terminal, and a safety device.

The mobile terminal wirelessly transmits a control signal, based on an operation input from an operator performing remote support of the mobile body, to the mobile body.

The safety device is physically connected to the mobile terminal, and exchanges diagnostic signals with the mobile body via the mobile terminal.

The mobile body executes traveling control of the mobile body based on the control signal from the mobile terminal, when an abnormality is not detected in the diagnostic signal received from the safety device via the mobile terminal, and does not execute the traveling control when the abnormality is detected.

A mobile body according to the present disclosure is remotely supported based on a control signal that is wirelessly transmitted from a mobile terminal operated by an operator.

A safety device is physically connected to the mobile terminal.

The safety device exchanges diagnostic signals with the mobile body via the mobile terminal.

The mobile body includes one or more processors.

The one or more processors execute traveling control of the mobile body based on the control signal from the mobile terminal, when an abnormality is not detected in the diagnostic signal received from the safety device via the mobile terminal, and do not execute the traveling control when the abnormality is detected.

According to the present disclosure, the safety device that exchanges diagnostic signals with the mobile body via the mobile terminal is physically connected to the mobile terminal. The mobile body is configured not to execute traveling control of the mobile body based on control signals from the mobile terminal when an abnormality is detected in the diagnostic signals received from the safety device via the mobile terminal. This enables achieving both convenience of remote support using the mobile terminal, and suppressing unintended behavior of the mobile body when an abnormality occurs in the operating system using the mobile terminal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic diagram illustrating a configuration example of a remote support system according to an embodiment;

DETAILED DESCRIPTION OF EMBODIMENTS

Figure 2:
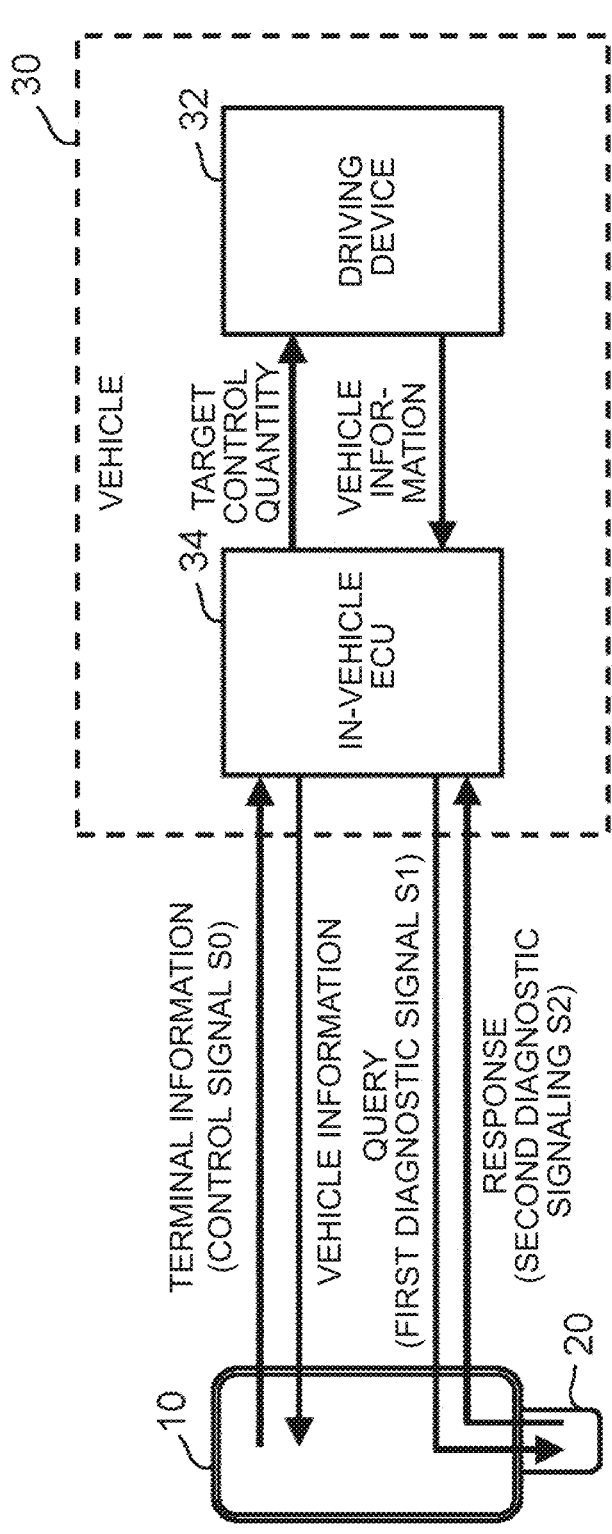
FIG. 2 is a diagram for describing communication between a mobile terminal and vehicles during remote supporting.

Embodiments of the present disclosure will be described with reference to the accompanying drawings.

1. Configuring a Remote Support System

Consider remote support of a mobile body. Remote supports are concepts that include remote monitoring, remote assistance, and remote driving. Examples of the mobile body include a vehicle, a robot, and the like. The vehicle may be an autonomous vehicle or a vehicle driven by a driver. Examples of the robot include a logistics robot. As an example, in the following description, a case where a mobile body that is a target of remote support is a vehicle will be considered. In the case of generalization, "vehicle" in the following description is read as "mobile body".

Figure 1:
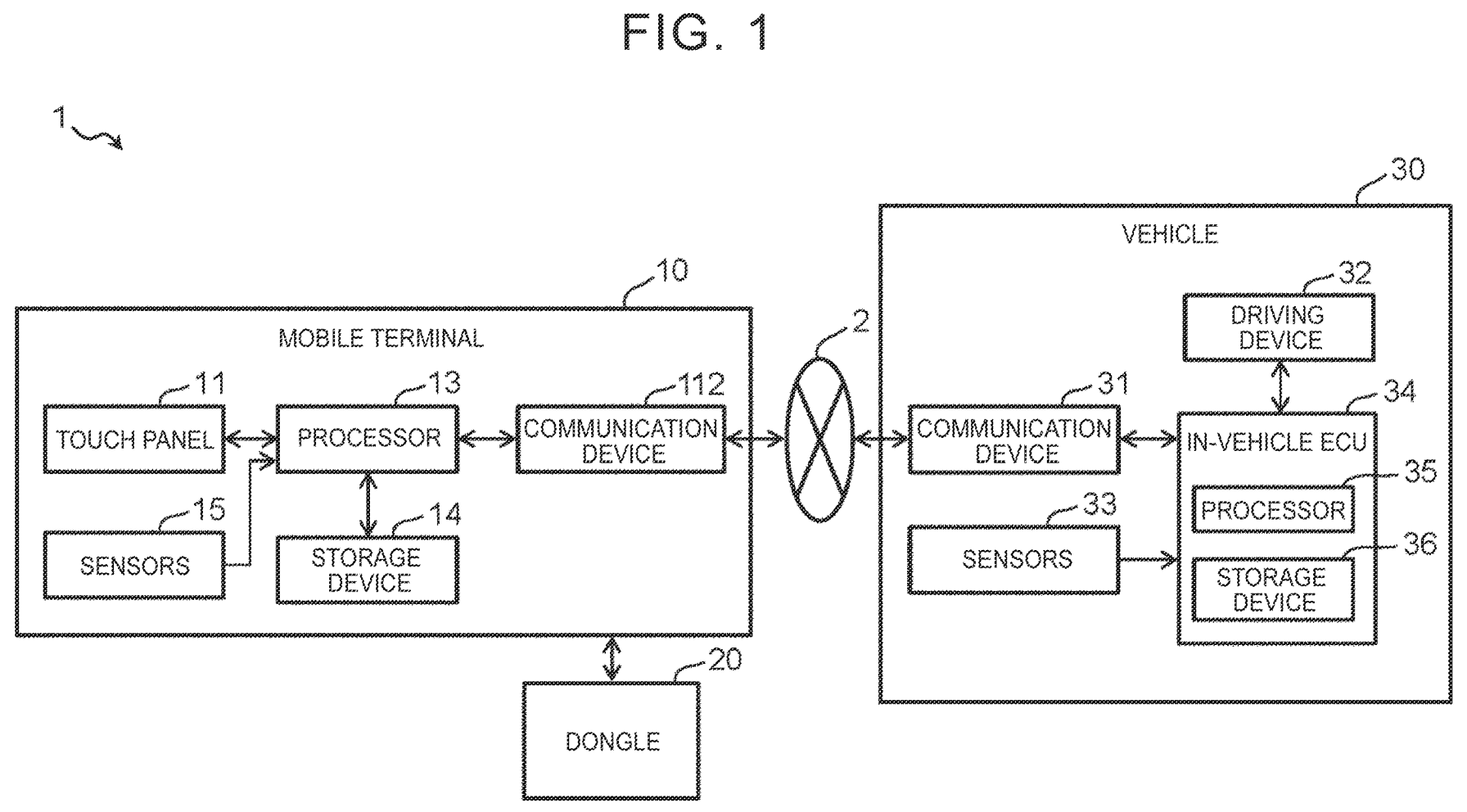

FIG. 1 is a schematic diagram illustrating a configuration example of a remote support system 1 according to an embodiment. The remote support system 1 includes a mobile terminal (or simply a terminal) 10, a dongle 20, and a vehicle 30. Vehicle 30 receives remote support based on signals wirelessly transmitted from terminal 10.

The terminal 10 is operated by an operator who remotely supports the vehicle 30. Remote support using the terminal 10 includes remote driving of the vehicle 30 using an operation of tilting the terminal 10. In the case of remote driving, the control signal S0 based on the operation inputted from the operator to the terminal 10 for the traveling control (motion control) of the vehicle 30 corresponds to the signal wirelessly transmitted from the terminal 10 to the vehicle 30. The terminal 10 is, for example, a smartphone. Alternatively, the terminal 10 may be, for example, a tablet terminal or a notebook terminal.

The terminal 10 includes, for example, a touch panel 11, a communication device 12, a processor 13, a storage device 14, and sensors 15. The touch panel 11 is formed on one plate surface of the terminal 10. The touch panel 11 is configured to be capable of displaying a desired image. The touch panel 11 includes a touch sensor. The touch sensor is configured to be able to detect the presence or absence of an operator's touch on the touch panel 11. The communication device 12 is configured to be able to communicate with the vehicle 30 via the wireless communication network 2.

The processor 13 executes various processes for remote support including remote driving of the vehicle 30. The storage device 14 stores various kinds of information necessary for processing by the processor 13. More specifically, the processor 13 executes various processes using various programs related to remote support. The various programs may be stored in the storage device 14 or may be recorded in a computer-readable recording medium. The sensors 15 include, for example, an inclination angle sensor and a position sensor. The inclination angle sensor detects an inclination angle (posture) of the terminal 10. The inclination angle sensor includes, for example, a six-axis gyro sensor. The tilt angle of the terminal 10 is used for remote driving of the vehicle 30 using the operation of tilting the terminal 10. The position sensor includes a Global Navigation Satellite System (GNSS) receiver and detects a position and an orientation of the terminal 10.

The dongle 20 corresponds to an example of a "safety device" according to the present disclosure. The dongle 20 is used in a state of being physically connected to the terminal 10 in remote driving (remote support). The dongle 20 includes a processor that executes a "predetermined operation" described later. More specifically, the dongle 20 is a small device that is physically connected to the terminal 10 using connection methods, such as a universal serial bus (USB) connection, rather than a wireless connection. For example, while the remote driving is not performed, the dongle 20 is mounted on the vehicle 30. During remote driving, the dongle 20 is removed from the vehicle 30 and attached to the terminal 10.

The vehicle 30 includes a communication device 31, a traveling device 32, sensors 33, and an in-vehicle electronic control unit (an in-vehicle ECU) 34. The communication device 31 communicates with the outside of the vehicle 30. For example, the communication device 31 communicates with the terminal 10 via the wireless communication network 2. The traveling device 32 includes a steering device, a driving device, and a braking device. The steering device includes an electric motor that steers wheels. The drive device includes one or both of an electric motor and an internal combustion engine for driving the vehicle 30. The braking device includes a brake actuator for braking the vehicle 30.

The sensors 33 include a recognition sensor, a vehicle state sensor, and a position sensor. The recognition sensor recognizes a situation around the vehicle 30. Examples of recognition sensors include cameras, Laser Imaging Detection and Ranging (LIDAR), radars, and the like. The vehicle state sensor detects a state of the vehicle 30. The vehicle state sensor includes a speed sensor, an acceleration sensor, a yaw rate sensor, a steering angle sensor, and the like. The position sensor detects a position and an azimuth of the vehicle 30. For example, the position sensor includes a GNSS receiver.

The in-vehicle ECU 34 is a computer that controls the vehicles 30. The in-vehicle ECU 34 includes one or more processors 35 (hereinafter simply referred to as processors 35) and one or more storage devices 36 (hereinafter simply referred to as storage devices 36). The processor 35 executes various processes related to the control of the vehicle 30. The storage device 36 stores various kinds of information necessary for processing by the processor 35.

2. Management of Vehicle Traveling Control Using a Mobile Terminal

The mobile terminal 10 is used to remotely control the travel of the vehicle 30. By using the operating system of the vehicle 30 using the terminal 10, the operator can remotely control the vehicle traveling by operating the terminal 10 inside or outside the vehicle 30.

FIG. 2 is a diagram for explaining exchange of information (signals) between the mobile terminal 10 and the vehicle 30 during execution of remote support. In order to realize remote support, the terminal 10 and the vehicle 30 exchange information. The information exchanged includes vehicle information and terminal information.

The vehicle information is various types of information related to remote support, and is obtained by the sensors 33. The in-vehicle ECU 34 transmits the vehicle-information to the terminal 10 via the communication device 31.

The terminal information is also various types of information related to remote support. The terminal information includes a control signal based on an operation input from an operator. In the case of remote driving, the "control signal based on an operation input from the operator" corresponds to a control signal S0 of the vehicle 30 based on an operation of the operator tilting the terminal 10 (that is, an operation directly input from the operator to the terminal 10). More specifically, the control signal S0 is, for example, a target control amount which is a target value of a control amount of movement in at least one of the front-rear direction and the lateral direction of the vehicles 30. The target control amount is, for example, one or more of a target vehicle speed, a target (front-rear) acceleration, a target steering angle, a target yaw rate, and a target lateral acceleration. In addition, the control signal S0 may be basic information for calculating the target control quantity. The basic information is, for example, information on an inclination angle of the terminal 10 according to an operation of tilting the terminal 10. The terminal 10 transmits the terminal information including the control signal S0 to the vehicle 30 (in-vehicle ECU 34) via the communication device 12.

In the case where the control signal S0 included in the terminal information received from the terminal 10 is the target control amount, the in-vehicle ECU 34 outputs (instructs) the target control amount to the traveling device 32 to control the traveling (motion) of the vehicle 30. Alternatively, in the case where the control signal S0 is the basic information of the target control amount, the in-vehicle ECU 34 calculates the target control amount based on the basic information, and outputs the calculated target control amount to the traveling device 32 to control the traveling of the vehicle 30.

If an abnormality occurs in the operating system using the terminal 10, an unintended vehicle behavior may occur. In order to avoid such a situation, it is conceivable to provide the vehicle 30 with an emergency stop switch. However, such measures require the operator to remain in the vicinity of the vehicle 30 during the execution of the remote support despite using the mobile terminal 10 for remote support. This is undesirable in the convenience of remote support using the terminal 10. Here, the abnormality of the "operating system using the terminal 10" includes an abnormality of the terminal 10 itself such as a failure and an abnormality of communication from the terminal 10 to the vehicle 30.

In order to realize an emergency stop function of the vehicle 30 in view of the above-described problem, the remote support system 1 according to the present embodiment includes a dongle 20 that is used in a state of being physically connected to the terminal 10. In the remote support system 1, the traveling control of the vehicle 30 using the terminal 10 is permitted on the assumption that the dongle 20 is attached to the terminal 10.

The in-vehicle ECU 34 exchanges "diagnostic signals" with the dongle 20 via the terminal 10. The diagnostic signal is a signal used for abnormality diagnosis of the "operating system using the terminal 10". Specifically, as shown in FIG. 2, the diagnostic signal includes a first diagnostic signal S1 as an inquiry and a second diagnostic signal S2 as an answer. The inquiry is transmitted from the vehicle 30 to the dongle 20 via the terminal 10. The answer is transmitted (returned) from the dongle 20, which has received the first diagnostic signal S1, to the vehicles 30 via the terminal 10.

More specifically, the dongle 20 is associated with the in-vehicle ECU 34 on a one-to-one basis. As described above, the in-vehicle ECU 34 transmits an inquiry (first diagnostic signal S1) to the dongle 20 via the terminal 10. The dongle 20 generates an answer (second diagnostic signal S2) by performing a "predetermined operation" on the received inquiry. Then, the dongle 20 transmits the generated answer to the vehicle 30 via the terminal 10. The in-vehicle ECU 34 verifies the received answer and detects an abnormality in the answer (second diagnostic signal S2) based on the result of the verification. A specific example of "predetermined calculation" will be described later together with FIG. 3.

When no abnormality is detected in the second diagnostic signal S2 received from the dongle 20 via the terminal 10 (that is, when the answer from the dongle 20 is appropriate), the in-vehicle ECU 34 (the vehicle 30) executes the traveling control of the vehicle 30 based on the control signal S0 from the terminal 10. In other words, the in-vehicle ECU 34 permits driving (operating) of the vehicles 30 using the terminals 10. On the other hand, when the abnormality is detected (that is, when the answer from the dongle 20 is inappropriate), the in-vehicle ECU 34 does not execute the traveling control. In other words, the in-vehicle ECU 34 does not allow the traveling control.

Figure 3:
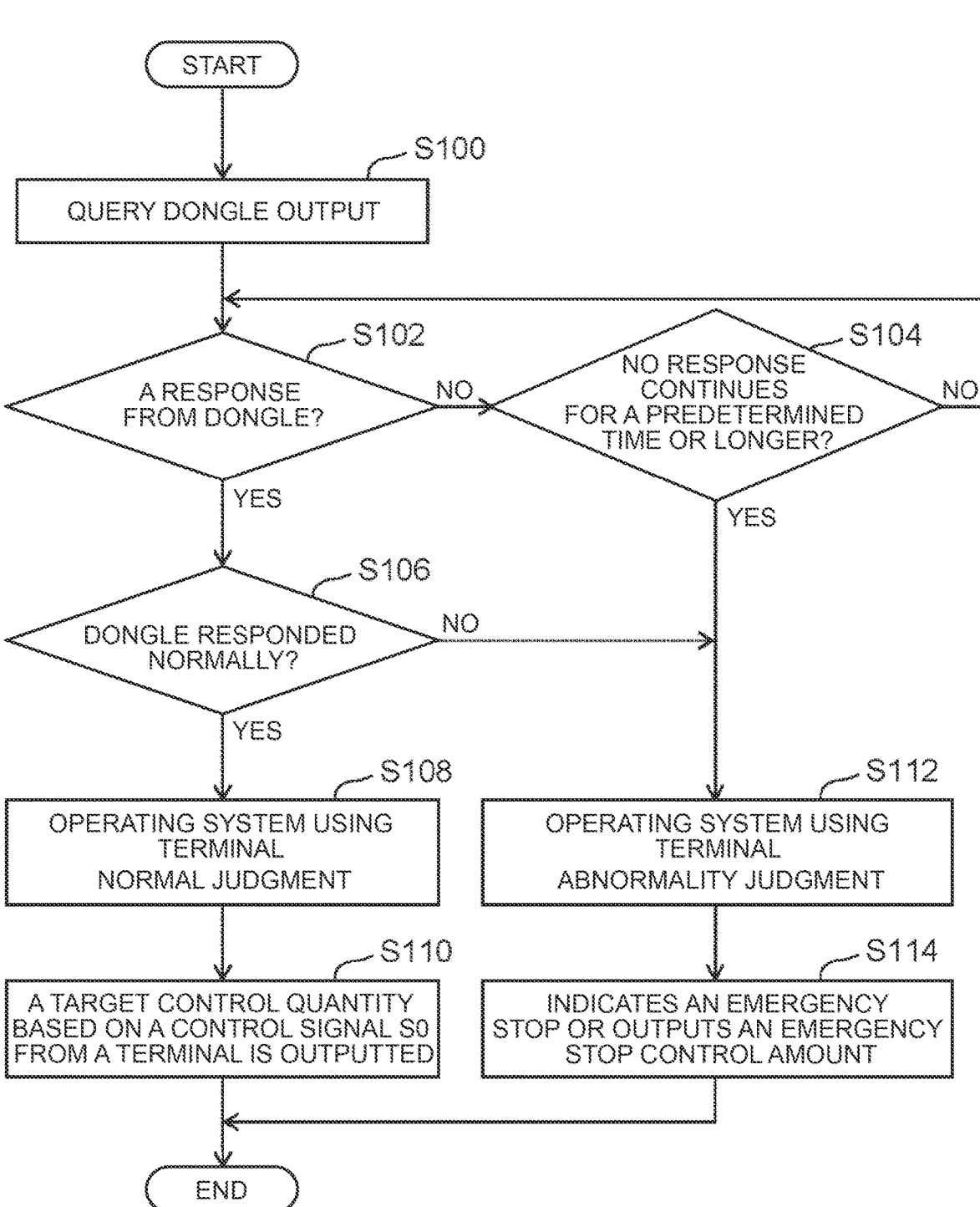
FIG. 3 is a flowchart illustrating a specific example of a process related to management of traveling control of a vehicle using the mobile terminal according to the embodiment.

FIG. 3 is a flowchart illustrating a specific example of a process related to management of traveling control of the vehicle 30 using the mobile terminal 10 according to the embodiment. The process of this flow chart is repeatedly executed by the in-vehicle ECU 34 (processor 35). The processing of the flowchart is started, for example, when the vehicle 30 receives the terminal information from the terminal 10 wearing the dongle 20.

In S100, the in-vehicle ECU 34 executes a process of inquiring (transmitting) the dongle 20 (first diagnostic signal S1). The dongle 20 that has received the inquiry via the terminal 10 performs "predetermined calculation" to generate an answer (second diagnostic signal S2), and transmits the generated answer to the vehicle 30 via the terminal 10. Such inquiry and answer exchange are performed between the in-vehicle ECU 34 and the dongle 20 without being specified by the terminal 10.

The details of the calculation performed by the dongle 20 are determined in advance between the in-vehicle ECU 34. The transmission of the content of the calculation from the in-vehicle ECU 34 to the dongle 20 can be performed, for example, as follows. That is, the content of the calculation is registered in the dongle 20 when the in-vehicle ECU 34 is shipped or when the vehicle 30 equipped with the in-vehicle ECU 34 is shipped. Alternatively, the content of the calculation may be registered in the dongle 20 when the software update of the vehicle 30 is executed. Further, the content of the calculation may be notified to the dongle 20 by the terminal 10 reading a Quick Response (QR) code (registered trademark) outputted to the monitor of the vehicle 30 equipped with the in-vehicle ECU 34.

The operation by the dongle 20 is performed, for example, as follows. That is, the in-vehicle ECU 34 presents the numerical value N1 as an inquiry to the dongle 20. The dongle 20 performs an operation on the numerical value N1 presented from the in-vehicle ECU 34, and replies a result of the operation (numerical value N3) to the in-vehicle ECU 34. An exemplary operation content negotiated between the in-vehicle ECU 34 and the dongle 20 is as follows. That is, the dongle 20 calculates and responds to a numerical value N3 (=N1+N2) obtained by adding a predetermined numerical value N2 to a numerical value N1 as an inquiry by the dongle 20.

The exchange between the in-vehicle ECU 34 and the dongle 20 is performed at a certain frequency, for example. The dongle 20 is required to calculate and output an appropriate answer to an inquiry from the in-vehicle ECU 34 at a certain frequency. As an example, the exchange is performed by the in-vehicle ECU 34 presenting three numerical values N1 in order within a predetermined time-period as described below. Here, the numerical value N2 is, for example, 3.

If the numerical value N3 calculated by the dongle 20 is 8 (=5+3) when the numerical value N1 as the first inquiry is 5, it can be said that the answer (second diagnostic signal S2) is normal. Next, if the numerical value N3 calculated when the numerical value N1 as the second inquiry is 6 is 9 (=6+3), it can be said that the answer (second diagnostic signal S2) is normal. Next, if the numerical value N3 calculated when the numerical value N1 as the third inquiry is 7 is, for example, 11 (=7+4), since it differs from 10 (=7+3) which is a correct answer, it can be said that the answer (second diagnostic signal S2) is abnormal. The reason why the answer from the dongle 20 does not indicate the intended numerical value is, for example, that the value of the answer is increased or the answer is fixed when the answer passes through the terminal 10.

In S102 following S100, the in-vehicle ECU 34 determines whether or not an answer (second diagnostic signal S2) from the dongle 20 regarding the above-described exchange has been received. In an example where the exchange occurs at a certain frequency, it is determined whether all answers have been received. If the in-vehicle ECU 34 has not received a response (S102; No), the process proceeds to S104.

In S104, the in-vehicle ECU 34 determines whether or not the non-answer status from the dongle 20 has continued for a predetermined period or longer. If the predetermined period of time has not elapsed without the answer (S104; No), the process returns to S102.

On the other hand, when the in-vehicle ECU 34 receives the answer from the dongle 20 (S102; Yes), the process proceeds to S106. In S106, the in-vehicle ECU 34 determines whether the answer is normal. More specifically, in the case where the exchange is performed at a certain frequency as described above, if all the answers are normal, the determination is Yes. On the other hand, if one or more of the answers is abnormal, the determination is No.

When the answer is normal (S106; Yes), in S108, the in-vehicle ECU 34 determines that the "operating system using the terminal 10" is normal. Next, in S110, the in-vehicle ECU 34 outputs a target control variable based on the control signal S0 included in the terminal information to the traveling device 32.

On the other hand, when the answer is abnormal (S106; No), that is, when the answer is not appropriate, the process proceeds to S112. In addition, when the non-answer status continues for a predetermined period or longer (S104; Yes), since the answer is inappropriate, the process proceeds to S112. The reason why the non-answer state continues for a predetermined time or longer is, for example, that the communication from the terminal 10 to the vehicle 30 is interrupted or that the dongle 20 is removed from the terminal 10 during the execution of the remote driving.

In S112, the in-vehicle ECU 34 determines that the "operating system using the terminal 10" is abnormal. Next, in S114, the in-vehicle ECU 34 instructs the traveling device 32 to stop the vehicle 30 in an emergency. Alternatively, the in-vehicle ECU 34 outputs the target control quantity for the emergency stopping of the vehicle 30 to the traveling device 32 regardless of the control signal S0 included in the terminal information.

As described above, according to the present embodiment, the remote driving of the vehicle 30 is performed using the terminal 10 to which the dongle 20 as an emergency stop means of the vehicle 30 is physically connected. During remote driving, the in-vehicle ECU 34 (vehicle 30) exchanges diagnostic signals with the dongle 20 via the terminal 10. Then, the in-vehicle ECU 34 permits the traveling control of the vehicle 30 using the terminal 10 only when the answer from the dongle 20 (second diagnostic signal S2) is appropriate. Thus, the vehicle 30 can be stopped in an emergency by detecting the occurrence of an abnormality in the operating system using the terminal 10 without restricting the location and movement of the operator during execution of the remote driving as compared with an example in which the emergency stop switch is provided in the vehicle.

As described above, according to the present embodiment, the convenience of remote driving (remote support) using the mobile terminal 10 and the suppression of the behavior of the unintended vehicle 30 (mobile body) when an abnormality occurs in the operating system using the mobile terminal 10 can be suitably achieved.

What is claimed is:

1. A remote support system, comprising:
a mobile body;
a mobile terminal, the mobile terminal wirelessly transmitting a control signal to the mobile body based on an operation input from an operator performing remote support of the mobile body; and
a safety device that is detachable from the mobile terminal, is physically connected to the mobile terminal during the remote support of the mobile body, and exchanges diagnostic signals with the mobile body via the mobile terminal,
wherein the safety device
generates a first diagnostic signal among the diagnostic signals, and
transmits the first diagnostic signal to the mobile body via the mobile terminal, and
wherein the mobile body receives the first diagnostic signal from the safety device via the mobile terminal,
determines whether an abnormality is present based on the first diagnostic signal,
executes traveling control based on the control signal from the mobile terminal in response to the abnormality not being detected from the first diagnostic signal, and
does not execute the traveling control in response to the abnormality being detected.

2. The remote support system according to claim 1, wherein the mobile body does not execute the traveling control in a case where the first diagnostic signal is not received from the safety device via the mobile terminal.

3. The remote support system according to claim 1, wherein:
the diagnostic signals further include a second diagnostic signal that is transmitted from the mobile body to the safety device via the mobile terminal;
the first diagnostic signal is generated in response to receipt of the second diagnostic signal by performing predetermined computation on the second diagnostic signal that is received; and
the mobile body verifies the first diagnostic signal that is received, and detects whether the abnormality is present based on a result of the verification.

4. The remote support system according to claim 1, wherein the mobile terminal generates the control signal based on an operation directly input from the operator to the mobile terminal.

5. A mobile body that is remotely supported based on a control signal that is wirelessly transmitted from a mobile terminal operated by an operator, wherein:
a safety device detachable from the mobile terminal, being physically connected to the mobile terminal during remote support of the mobile body and exchanging diagnostic signals with the mobile body via the mobile terminal, the safety device receiving a first diagnostic signal among the diagnostic signals from the mobile body via the mobile terminal, generating a second diagnostic signal among the diagnostic signals in response to receipt of the first diagnostic signal, and transmitting the second diagnostic signal to the mobile body via the mobile terminal;
the mobile body includes one or more processors; and
the one or more processors are configured to
transmit the first diagnostic signal to the safety device via the mobile terminal,
receive the second diagnostic signal from the safety device via the mobile terminal,
determine whether an abnormality is present based on the second diagnostic signal,
execute traveling control based on the control signal from the mobile terminal in response to the abnormality not being detected from the second diagnostic signal, and
not execute the traveling control in response to the abnormality being detected.

6. The remote support system according to claim 1, wherein
the mobile body is a vehicle,
the safety device is a dongle,
the remote support is remote driving,
the dongle is mounted on the vehicle in a case where the remote driving is not performed, and
the dongle is physically connected to the mobile terminal during the remote driving.

7. The remote support system according to claim 1, wherein the control signal is a target control amount, which is a target value of a control amount of movement in at least one of a front-rear direction or a lateral direction of the mobile body, and the diagnostic signals are signals used for abnormality diagnosis on the operation using the mobile terminal.

8. The remote support system according to claim 1, wherein the safety device is associated with an ECU of the mobile body on a one-to-one basis.

9. The remote support system according to claim 1, wherein the diagnostic signals are exchanged between the mobile body and the safety device at a certain frequency.

10. The remote support system according to claim 3, wherein the predetermined computation is determined before the remote support of the mobile body between the safety device and the mobile body.

11. The remote support system according to claim 3, wherein the safety device is associated with an ECU of the mobile body on a one-to-one basis, and the predetermined computation is determined before the remote support of the mobile body between the safety device and the mobile body.

12. The mobile body according to claim 5, wherein the one or more processors are further configured to stop the mobile body in an emergency in response to the abnormality being detected.

\* \* \* \* \*